United States Patent
Shen et al.

(10) Patent No.: US 8,817,823 B2
(45) Date of Patent: Aug. 26, 2014

(54) METHOD AND DEVICE FOR TIME SYNCHRONIZATION

(71) Applicant: Huawei Technologies Co., Ltd., Guangdong (CN)

(72) Inventors: Xinyu Shen, Shenzhen (CN); Jianmei Zhang, Shenzhen (CN); Congqi Li, Plano, TX (US); Tianhai Chang, Shenzhen (CN); Hao Liu, Shenzhen (CN); Zhiguo Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 13/735,858

(22) Filed: Jan. 7, 2013

(65) Prior Publication Data
US 2013/0121352 A1 May 16, 2013

Related U.S. Application Data

(63) Continuation of application No. PCT/CN2010/075446, filed on Jul. 23, 2010.

(51) Int. Cl.
*H04J 3/06* (2006.01)
*H04J 14/02* (2006.01)

(52) U.S. Cl.
CPC ........... *H04J 3/0602* (2013.01); *H04J 14/0201* (2013.01); *H04J 3/0667* (2013.01)
USPC ........... 370/503; 370/498; 370/464; 370/463; 375/365; 375/364; 375/354

(58) Field of Classification Search
CPC ....... H04J 3/0602; H04J 3/06; H04J 14/0201; H04W 56/00; H04B 7/212
See application file for complete search history.

(56) References Cited

U.S. PATENT DOCUMENTS

| 7,916,758 B2 | 3/2011 | Sun et al. |
| 2007/0008993 A1 | 1/2007 | Cha et al. |
| 2009/0162065 A1 | 6/2009 | Mizutani et al. |

FOREIGN PATENT DOCUMENTS

| CN | 101232457 A | 7/2008 |
| CN | 101431385 A | 5/2009 |

(Continued)

OTHER PUBLICATIONS

Written Opinion of the International Searching Authority in corresponding International Patent Application No. PCT/CN2010/075446 (Apr. 28, 2011).

(Continued)

*Primary Examiner* — Anez Ebrahim
(74) *Attorney, Agent, or Firm* — Leydig, Voit & Mayer, Ltd.

(57) ABSTRACT

A method and a device for time synchronization are disclosed according to the embodiments of the present invention. The method includes: selecting, by a slave device, a port of a single-fiber bi-directional line as a synchronization port of a 1588 clock protocol; specifying a work mode of the synchronization port; exchanging a 1588 clock synchronization packet with a master device through the synchronization port according to the work mode; acquiring transmission time information and restore a system clock according to the 1588 clock synchronization packet; and adjusting the system clock according to the work mode and the transmission time information. The device includes: a line processing module, a clock recovery module and a clock adjustment module. Through the method and the device, zero-error time synchronization is implemented; and in the case of unfixed path delay, the time synchronization can also be implemented.

10 Claims, 3 Drawing Sheets

(56) References Cited

FOREIGN PATENT DOCUMENTS

| CN | 101466052 A | 6/2009 |
|---|---|---|
| CN | 101729180 A | 6/2010 |
| WO | WO 2008/093600 A1 | 8/2008 |

OTHER PUBLICATIONS

"P1588 D2.2—Draft Standard for a Precision Clock Synchronization Protocol for Networked Measurement and Control Systems," 2007, IEEE, Pistcataway, New Jersey.

1st Office Action in corresponding Chinese Patent Application No. 201080003593.7 (Aug. 3, 2012).

Search Report in corresponding Chinese Patent Application No. 201080003593.7 (Feb. 2010).

Extended European Search Report in corresponding European Patent Application No. 10842868.1 (Dec. 20, 2012).

International Search Report in corresponding International Patent Application No. PCT/CN2010/075446 (Apr. 28, 2011).

"An Enhanced IEEE 1588 Time Synchronization Algorithm for Asymmetric Communication Link Using Block Burst Transmission," IEEE Communications Letters, Sep. 2008, vol. 12, No. 9, IEEE, New York, New York.

"IEEE Standard for a Precision Clock Synchronization Protocol for Networked Measurement and Control Systems," IEEE Std 1588, Jul. 24, 2008, IEEE, New York, New York.

METHOD AND DEVICE FOR TIME SYNCHRONIZATION

CROSS-REFERENCE TO RELATED APPLICATION

This application is a continuation of International Patent Application No. PCT/CN2010/075446, filed on Jul. 23, 2010, which is hereby incorporated by reference in its entirety.

FIELD OF THE INVENTION

The present invention relates to the field of communications technologies, and in particular, to a method and a device for time synchronization.

BACKGROUND OF THE INVENTION

With the development of various wireless communications technologies, by taking TD-SCDMA (Time Division-Synchronous Code Division Multiple Access, time division-synchronous code division multiple access) as an example, the wireless communications technologies have a demand of time synchronization in addition to the demand of frequency synchronization.

An IEEE 1588V2 protocol is generally adopted at present to implement a function of time synchronization in a double-fiber line. The principle is that: transmission time information is acquired according to a time stamp generated when a 1588 clock synchronization packet is exchanged on the double-fiber line. Based on the precondition that forward path delay and reverse path delay are consistent, path delay and time offset are calculated according to the transmission time information and further clocks of a master device and a slave device are adjusted to implement time synchronization. However, because of a fiber cable production error or a fiber cable joint, the length of a forward optical fiber line and the length of a reverse optical fiber line are different, and the forward path delay is different from the reverse path delay, so that the time offset occurs. Therefore, the path delay of the double-fiber line needs to be compensated. Two compensation methods exist at present:

The first compensation method is that, lengths of a forward line and a reverse line between the master device and the slave device are measured through an OTDR (Optical Time Domain Reflectometer, optical time domain reflectometer) or other means, a delay error is calculated, and an actual time is compensated.

The second compensation method is that, test is performed between the master device and the slave device through a GPS (Global Positioning System, global positioning system), GPS standard time and time restored from a transmission line are compared, and the actual time is compensated according to a comparison result.

In sum, in the existing technology of implementing the time synchronization through compensation, node by node measurement is required during network planning and deployment, and a compensation value is set manually, so the planning and the deployment are complicated. When line topology changes, measurement needs to be performed again and the compensation value needs to be set again, so maintenance is rather complicated. When path delay between the devices is not fixed (for example, under a line protection function, the time offset is dynamically changed), the existing compensation scheme cannot solve the problem of time synchronization. In addition, when no GPS signal exists in a position where the device is located, a rubidium clock needs to be configured additionally to capture the GPS signal, and then measurement and compensation are performed, which is complicated to implement.

SUMMARY OF THE INVENTION

To solve time offset caused by inconsistent path delays of a double-fiber line and reduce complexity of planning, deployment, maintenance and implementation of a network, and implement time synchronization in the case of unfixed path delay, embodiments of the present invention provide a method and a device for time synchronization. The technical solutions are as follows.

A method for time synchronization is provided, where the method includes:

selecting, by a slave device, a port of a single-fiber bi-directional line as a synchronization port of a 1588 clock protocol, and specifying a work mode of the synchronization port;

exchanging a 1588 clock synchronization packet with a master device through the synchronization port according to the work mode;

acquiring transmission time information and restoring a system clock according to the 1588 clock synchronization packet; and adjusting the system clock according to the work mode and the transmission time information.

A device for time synchronization is provided, where the device includes:

a line processing module, configured to select a port of a single-fiber bi-directional line as a synchronization port of a 1588 clock protocol, and specify a work mode of the synchronization port; exchange a 1588 clock synchronization packet with a master device through the synchronization port according to the work mode; and acquire transmission time information according to the 1588 clock synchronization packet;

a clock recovery module, configured to restore a system clock according to the 1588 clock synchronization packet; and a clock adjustment module, configured to adjust the system clock according to the work mode and the transmission time information.

The technical solutions provided by the embodiments of the present invention bring the following beneficial effects.

The single-fiber bi-directional line is used as the clock synchronization line, the 1588 clock synchronization packet is exchanged with the master device in the clock synchronization line according to the work mode of the clock synchronization line, so as to acquire the transmission time information, and adjust the restored system clock according to the work mode and the transmission time information, so that zero-error time synchronization is implemented, and reliability of clock transmission is high; measurement of a line length or GPS measurement is not required, deployment of a synchronization clock is simple, a rubidium clock does not need to be configured additionally, and complexity of planning, deployment, maintenance and implementation is low; and in the case of unfixed path delay, the time synchronization can also be implemented.

DETAILED DESCRIPTION OF THE EMBODIMENTS

In order to make the objectives, technical solutions and advantages of the present invention clearer, embodiments of the present invention are described in detail in the following with reference to the accompanying drawings.

Embodiment 1

Figure 1:
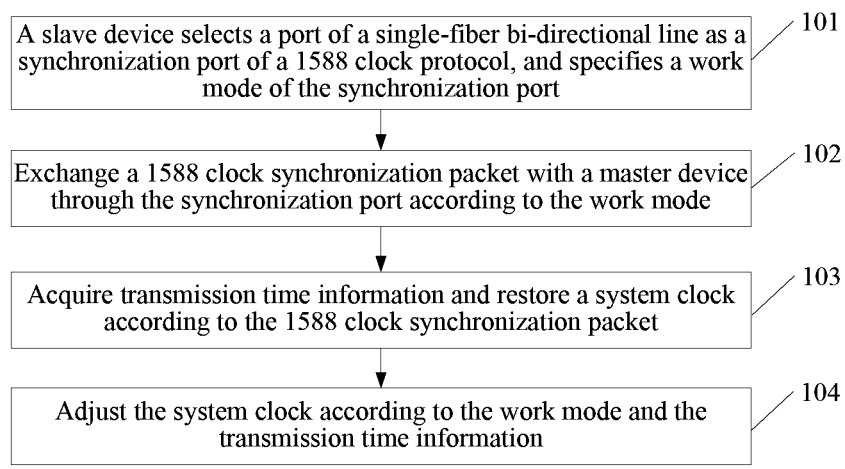
FIG. 1 is a flow chart of a method for time synchronization according to Embodiment 1 of the present invention.

Referring to FIG. 1, this embodiment provides a method for time synchronization. The method includes the following steps:

101: A slave device selects a port of a single-fiber bi-directional line as a synchronization port of a 1588 clock protocol, and specifies a work mode of the synchronization port;

102: Exchange a 1588 clock synchronization packet with a master device through the synchronization port according to the work mode;

103: According to the 1588 clock synchronization packet, acquire transmission time information and restore a system clock; and 104: Adjust the system clock according to the work mode and the transmission time information.

Through the method provided by the embodiment, the single-fiber bi-directional line is used as the clock synchronization line, the 1588 clock synchronization packet is exchanged with the master device in the clock synchronization line according to the work mode of the clock synchronization line, so as to acquire the transmission time information, and adjust the restored system clock according to the work mode and the transmission time information, so that zero-error time synchronization is implemented, and reliability of clock transmission is high; measurement of a line length or GPS measurement is not required, deployment of a synchronization clock is simple, a rubidium clock does not need to be configured additionally, and complexity of planning, deployment, maintenance and implementation is low; and in the case of unfixed path delay, the time synchronization can also be implemented.

Embodiment 2

Figure 2:
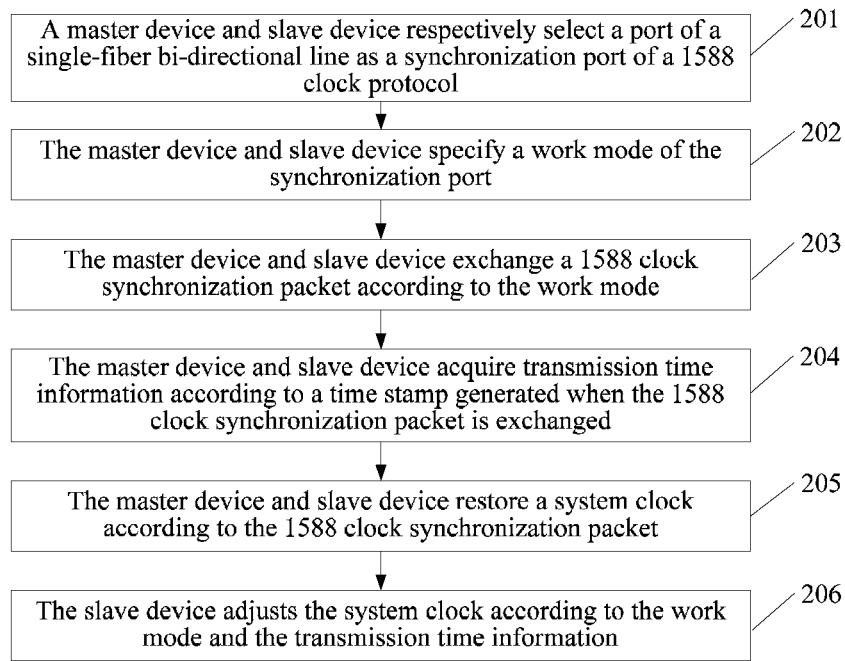
FIG. 2 is a flow chart of a method for time synchronization according to Embodiment 2 of the present invention.

Referring to FIG. 2, this embodiment provides a method for time synchronization. The method includes the following steps.

201: A master device and a slave device select a port of a single-fiber bi-directional line as a synchronization port of a 1588 clock protocol;

Before selecting the synchronization port, the device may determine the device itself as a master device or a slave device by setting a clock master or slave state of a synchronization port of the device itself.

In a clock synchronization system, the master device and slave device should select the same single-fiber bi-directional line as a clock synchronization line.

202: The master device and slave device specify a work mode of the synchronization port.

In the clock synchronization system, the master device and slave device should select the same work mode. The work modes specifically include a time division multiplexing mode and a wavelength division multiplexing mode.

203: The master device and slave device exchange a 1588 clock synchronization packet according to the work mode.

When the work mode is the time division multiplexing mode, a master device sends a synchronization Sync packet to a slave device through the synchronization port in a first time slice T1; the slave device sends a delay request Delay_Req packet to the master device through the synchronization port in a second time slice T2 after receiving the Sync packet through the synchronization port; the master device returns a delay response Delay_Resp packet to the slave device through the synchronization port in a third time slice T3 after receiving the Delay_Req packet; and the slave device receives the Delay_Resp packet through the synchronization port.

When the work mode is the wavelength division multiplexing mode, a master device sends a synchronization Sync packet with a wavelength of a forward wavelength $\lambda 1$ (that is, a forward frequency f1) to a slave device through the synchronization port; the slave device sends a delay request Delay_Req packet with a wavelength of a reverse wavelength $\lambda 2$ (that is, a reverse frequency f2) to the master device through the synchronization port after receiving the Sync packet through the synchronization port; the master device returns a delay response Delay_Resp packet of the forward wavelength $\lambda 1$ to the slave device through the synchronization port after receiving the Delay_Req packet; and the slave device receives the Delay_Resp packet through the synchronization port.

204: The master device and slave device acquire transmission time information according to a time stamp generated when the 1588 clock synchronization packet is exchanged.

The transmission time information is specifically a first time t1, a second time t2, a third time t3, and a fourth time t4. The first time t1 is the time of sending the Sync packet by the master device; the second time t2 is the time of receiving the Sync packet by the slave device; the third time t3 is the time of sending the Delay_Req packet by the slave device; and the fourth time t4 is the time of receiving the Delay_Req packet by the master device, where the fourth time may be carried in the Delay_Resp packet to be transmitted to the slave device.

Figure 3:
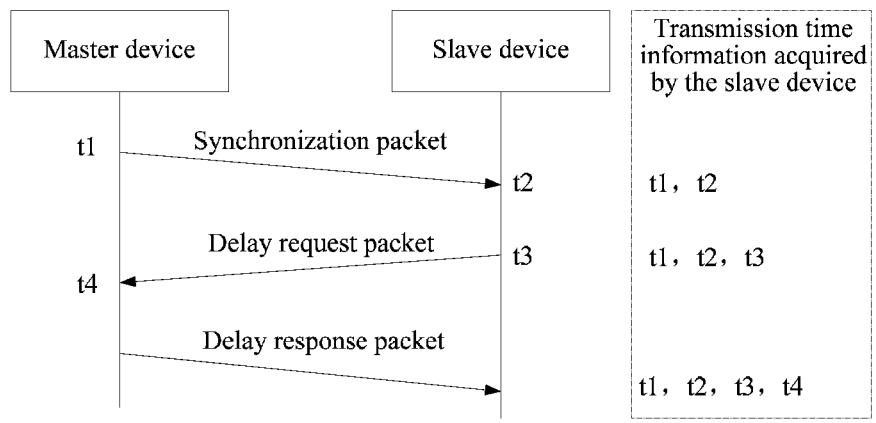
FIG. 3 is a schematic diagram of acquiring transmission time information according to Embodiment 2 of the present invention.

Referring to FIG. 3, the acquiring, by the master device and slave device, the transmission time information specifically includes:

acquiring the first time and the second time according to a time stamp generated when the synchronization packet is exchanged, and acquiring the third time and the fourth time according to a time stamp generated when the delay request packet is exchanged.

205: The master device and slave device restore a system clock according to the 1588 clock synchronization packet.

206: The slave device adjusts the system clock according to the work mode and the transmission time information.

a) When the work mode is the time division multiplexing mode, the following steps are performed.

a1) Calculate path delay and time offset according to a first formula and a second formula, where
the first formula is t2−t1=Delay+Offset,
the second formula is t4−t3=Delay2−Offset, $$Delay=[(t2-t1)+(t4-t3)]/2,$$

$$Offset=[(t2-t1)-(t4-t3)]/2, \text{ and}$$

t1 represents the first time, t2 represents the second time, t3 represents the third time, t4 represents the fourth time, Delay represents the path delay, and Offset represents the time offset.

a2) Adjust the system clock according to the time offset Offset.

Specifically, the system clock is adjusted according to t'=t−Offset.

where t' is a system clock after adjustment, and t is a system clock before adjustment.

When the work mode is the wavelength division multiplexing mode, the following steps are performed.

b1) Calculate the time offset, forward path delay, and reverse path delay according to a third formula, a fourth formula, a fifth formula and a sixth formula, where
the third formula is t2−t1=Delay+Offset,
the fourth formula is t4−t3=Delay2−Offset,
the fifth formula is Delay1=L/V1,
the sixth formula is Delay2=L/V2, $$Offset=[V1\times(t2-t1)-V2\times(t4-t3)]/(V1+V2),$$

$$Delay1=t2-t1-Offset,$$

$$Delay2=t4-t3+Offset, \text{ and}$$

t1 represents the first time, t2 represents the second time, t3 represents the third time, t4 represents the fourth time, Offset represents the time offset, Delay 1 represents the forward path delay, Delay 2 represents the reverse path delay, L represents a length of a single-fiber bi-directional line, V1 represents a forward propagation rate and can be determined according to the forward wavelength λ1, and V2 represents a reverse propagation rate and can be determined according to the reverse wavelength λ2.

b2) Calculate delay compensation according to the forward path delay and the reverse path delay.

Specifically, the delay compensation is calculated according to a seventh formula.

The seventh formula is Δt=(Delay2−Delay1)/2, where Δt represents the delay compensation.

The delay compensation is performed because different line frequencies cause different dispersion and inconsistent delay, which is essentially different from inconsistent delay caused by different line lengths in the prior art.

b3) Adjust the system clock according to the time offset Offset and the delay compensation Δt.

Specifically, the system clock is adjusted according to t'=t−Offset, where t' is a system clock after adjustment, and t is a system clock before adjustment.

Further, the master device and slave device may transmit the 1588 clock synchronization packet and a service packet through the single-fiber bi-directional line, where the 1588 clock synchronization packet may be transmitted through an overhead byte of the service packet.

Further, the master device and slave device may only transmit the 1588 clock synchronization packet through the single-fiber bi-directional line, and the service packet may be transmitted through another line. For example, the other line may be a double-fiber bi-directional line used for the service packet in the prior art, so as to be compatible with the prior art well.

Through the method provided by the embodiment, the slave device uses the single-fiber bi-directional line as the clock synchronization line, exchanges the 1588 clock synchronization packet with the master device in the clock synchronization line according to the work mode of the clock synchronization line, so as to acquire the transmission time information, and adjust the restored system clock according to the work mode and the transmission time information, so that zero-error time synchronization is implemented, and reliability of clock transmission is high; measurement of a line length or GPS measurement is not required, deployment of a synchronization clock is simple, a rubidium clock does not need to be configured additionally, and complexity of planning, deployment, maintenance and implementation is low; and in the case of unfixed path delay, the time synchronization can also be implemented.

Embodiment 3

Figure 4:
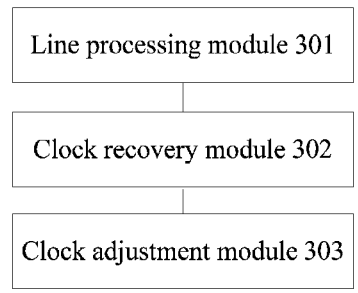
FIG. 4 is a schematic structural diagram of a device for time synchronization according to Embodiment 3 of the present invention.

Referring to FIG. 4, this embodiment provides a device for time synchronization. The device includes:

a line processing module 301, configured to select a port of a single-fiber bi-directional line as a synchronization port of a 1588 clock protocol, and specify a work mode of the synchronization port; exchange a 1588 clock synchronization packet with a master device through the synchronization port according to the work mode; and acquire transmission time information according to the 1588 clock synchronization packet;

a clock recovery module 302, configured to restore a system clock according to the 1588 clock synchronization packet; and a clock adjustment module 303, configured to adjust the system clock according to the work mode and the transmission time information.

When the work mode is a time division multiplexing mode, the line processing module 301 includes:

a first packet exchange unit, configured to receive, through the synchronization port, a synchronization packet sent by a master device in a first time slice; send, through the synchronization port, a delay request packet to the master device in a second time slice; and receive, through the synchronization port, a delay response packet returned by the master device in a third time slice.

When the work mode is a wavelength division multiplexing mode, the line processing module 301 includes:

a second packet exchange unit, configured to receive, through the synchronization port, a synchronization packet that is with a wavelength of a forward wavelength and is sent by a master device; send, through the synchronization port, a delay request packet with a wavelength of a reverse wavelength to the master device; and receive, through the synchronization port, a delay response packet that is with the wavelength of the forward wavelength and is returned by the master device.

The line processing module 301 includes:

a time acquisition unit, configured to: acquire a first time and a second time according to a time stamp generated when the synchronization packet is exchanged, where the 1588 clock synchronization packet includes the synchronization packet and the delay request packet, the first time is the time of sending the synchronization packet by the master device, and the second time is the time of receiving the synchronization packet by a slave device; and acquire a third time and a fourth time according to a time stamp generated when the delay request packet is exchanged, where the third time is the time of sending the delay request packet by the slave device, and the fourth time is the time of receiving the delay request packet by the master device.

When the work mode is the time division multiplexing mode, the clock adjustment module 303 includes:

a first calculation unit, configured to calculate time offset according to the first time, the second time, the third time, and the fourth time; and a first adjustment unit, configured to adjust the system clock according to the time offset.

The first calculation unit is specifically configured to:

calculate time offset Offset=[(t2−t1)−(t4−t3)]/2 according to a first formula and a second formula, where the first formula is t2−t1=Delay+Offset,
the second formula is t4−t3=Delay2−Offset, and
t1 represents the first time, t2 represents the second time, t3 represents the third time, t4 represents the fourth time, Delay represents path delay, and Offset represents the time offset.

When the work mode is the wavelength division multiplexing mode, the clock adjustment module 303 includes:

a second calculation unit, configured to calculate time offset Offset=[V1×(t2−t1)−V2×(t4−t3)]/(V1+V2), forward path delay Delay1=t2−t1−Offset, and reverse path delay Delay2=t4−t3+Offset according to a third formula, a fourth formula, a fifth formula, and a sixth formula;

a third calculation unit, configured to calculate delay compensation according to the forward path delay and the reverse path delay; and a second adjustment unit, configured to adjust the system clock according to the time offset and the delay compensation, where the third formula is t2−t1=Delay+Offset,
the fourth formula is t4−t3=Delay2−Offset,
the fifth formula is Delay1=L/V1,
the sixth formula is Delay2=L/V2,
t1 represents the first time, t2 represents the second time, t3 represents the third time, t4 represents the fourth time, Offset represents the time offset, Delay1 represents the forward path delay, Delay2 represents the reverse path delay, L represents a length of a single-fiber bi-directional line, V1 represents a forward propagation rate and is determined according to the forward wavelength in the wavelength division multiplexing mode, and V2 represents a reverse propagation rate and is determined according to the reverse wavelength in the wavelength division multiplexing mode.

The third calculation unit is specifically configured to:

calculate the delay compensation according to a seventh formula.

The seventh formula is Δt=(Delay2−Delay1)/2
where Δt represents the delay compensation.

The device for time synchronization provided in this embodiment and the slave device of the method embodiment belong to the same conception. For the specific implementation process of the device, reference may be made to the method embodiment, and details will not be described herein again.

Figure 5:
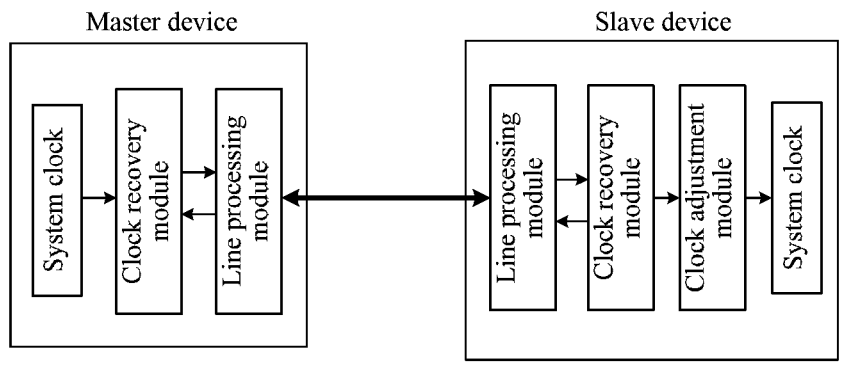
FIG. 5 is a schematic structural diagram of a system for time synchronization according to Embodiment 3 of the present invention.

In addition, in a time synchronization system, referring to FIG. 5, in addition to a slave device, a corresponding master device is further included. The master device also includes a line processing module 301 and a clock recovery module 302, the difference lies in that a clock master or slave state of the slave device is the slave device and a clock master or slave state of the master device is the master device, and that the master device does not include a clock adjustment module 303. For the interaction process between the master device and the slave device, reference may be made to the method embodiment, and details will not be described herein again.

Figure 6:
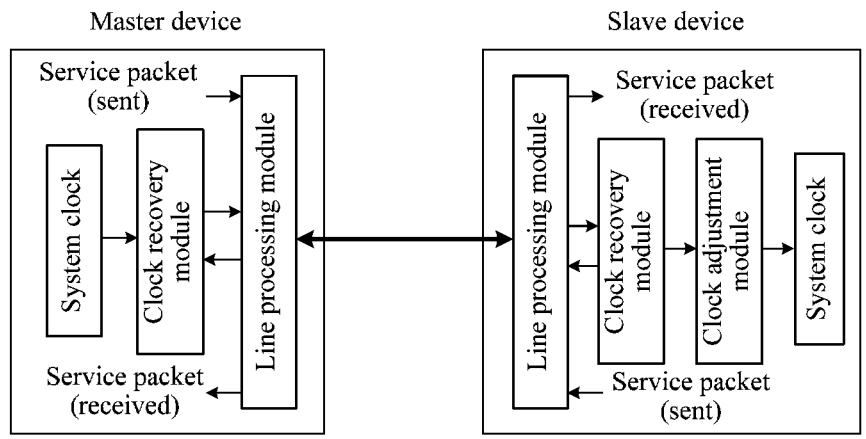
FIG. 6 is a schematic structural diagram of a single-fiber bi-directional service mode according to Embodiment 3 of the present invention.

Further, referring to FIG. 6, the line processing module 301 of the master device and slave device may transmit a 1588 clock synchronization packet and a service packet through a single-fiber bi-directional line, where the 1588 clock synchronization packet may be transmitted through the overhead byte of the service packet, that is, a single-fiber bi-directional service mode.

Figure 7:
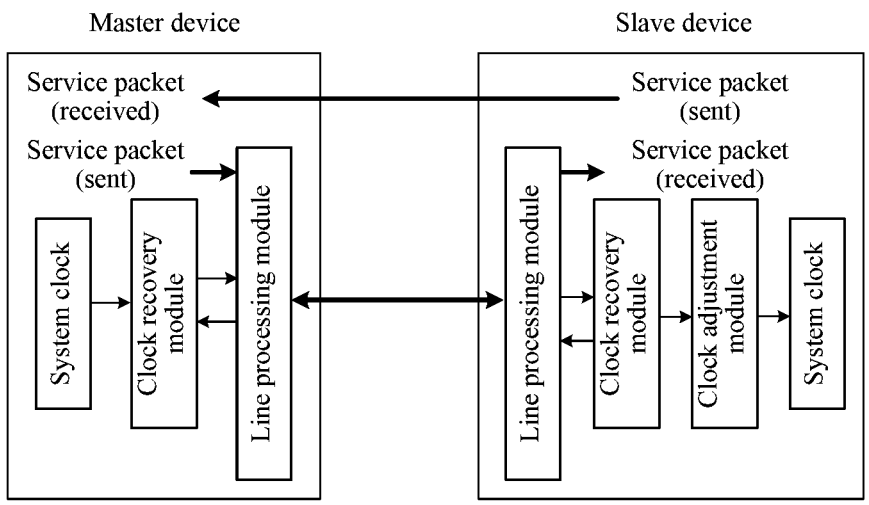
FIG. 7 is a schematic structural diagram of a double-fiber bi-directional service mode according to Embodiment 3 of the present invention.

Further, the line processing module 301 of the master device and slave device may only transmit the 1588 clock synchronization packet through the single-fiber bi-directional line, and the service packet may be transmitted through another line, that is, a double-fiber bi-directional service mode. For example, referring to FIG. 7, the other line may be a double-fiber bi-directional line used for the service packet in the prior art, so as to be compatible with the prior art well.

Through the device provided by the embodiment, the single-fiber bi-directional line is used as the clock synchronization line, the 1588 clock synchronization packet is exchanged with the master device in the clock synchronization line according to the work mode of the clock synchronization line, so as to acquire the transmission time information, and adjust the restored system clock according to the work mode and the transmission time information, so that zero-error time synchronization is implemented, and reliability of clock transmission is high; measurement of a line length or GPS measurement is not required, deployment of a synchronization clock is simple, a rubidium clock does not need to be configured additionally, and complexity of planning, deployment, maintenance and implementation is low; and in the case of unfixed path delay, the time synchronization can also be implemented.

All or a part of the content in the technical solutions according to the foregoing embodiments may be implemented through software programming. The software program is stored in a readable storage medium, such as a hard disk, an optical disk or a floppy disk in a computer.

The foregoing description is merely about exemplary embodiments of the present invention, but is not intended to limit the present invention. Any modification, equivalent replacement, or improvement made without departing from the spirit and principle of the present invention should fall within the protection scope of the present invention.

What is claimed is:

1. A method for time synchronization, comprising:
transmitting service packets via two lines between a slave device and a master device;
selecting, by the slave device, a port of a single-fiber bi-directional line of the two lines as a synchronization port of a 1588 clock protocol, and specifying a work mode of the synchronization port;
transmitting 1588 clock synchronization packets via the single-fiber bi-directional line, wherein each of the 1588 clock synchronization packets comprises a synchronization packet and a delay request packet;
exchanging the synchronization packet and the delay request packet with the master device through the synchronization port according to the work mode;
acquiring a first time and a second time according to a time stamp generated when the synchronization packet is exchanged, wherein the first time is a time of sending the synchronization packet by the master device, and the second time is a time of receiving the synchronization packet by the slave device;
acquiring a third time and a fourth time according to a time stamp generated when the delay request packet is exchanged, wherein the third time is a time of sending the delay request packet by the slave device, and the fourth time is a time of receiving the delay request packet by the master device;

restoring a system clock according to the 1588 clock synchronization packets; and adjusting the system clock according to the work mode and the first time, the second time, the third time and the fourth time, wherein adjusting the system clock according to the work mode and the first time, the second time, the third time and the fourth time comprises:

calculating a time offset by a first formula and a second formula, according to the first time, the second time, the third time, and the fourth time; and adjusting the system clock according to the time offset;

wherein the first formula is: $t2-t1=Delay+Offset$, wherein the second formula is: $t4-t3=Delay-Offset$, and wherein t1 represents the first time, t2 represents the second time, t3 represents the third time, t4 represents the fourth time, Delay represents path delay, and Offset represents a time offset.

2. The method according to claim 1, wherein the work mode is a time division multiplexing mode, and the exchanging the synchronization packet and the delay request packet with the master device through the synchronization port according to the work mode comprises:

receiving, by the slave device and through the synchronization port, the synchronization packet sent by the master device in a first time slice;

sending, by the slave device, the delay request packet to the master device in a second time slice through the synchronization port; and receiving, by the slave device and through the synchronization port, a delay response packet returned by the master device in a third time slice.

3. The method according to claim 2, wherein the adjusting the system clock according to the work mode and the first time, the second time, the third time and the fourth time, comprises:

calculating the time offset as $Offset=[(t2-t1)-(t4-t3)]/2$ according to the first time, the second time, the third time, and the fourth time; and adjusting the system clock according to the time offset.

4. The method according to claim 1, wherein the work mode is a wavelength division multiplexing mode, and the exchanging the synchronization packet and the delay request packet with the master device through the synchronization port according to the work mode comprises:

receiving, by the slave device and through the synchronization port, the synchronization packet that is with a wavelength of a forward wavelength and is sent by the master device;

sending, by the slave device and through the synchronization port, the delay request packet with a wavelength of a reverse wavelength to the mater device; and receiving, by the slave device and through the synchronization port, a delay response packet that is with a wavelength of the forward wavelength and is returned by the master device.

5. The method according to claim 4, wherein path delay in the first formula is a forward path delay $Delay1=t2-t1-Offset$, and path delay in the second formula is a reverse path delay $Delay2=t4-t3+Offset$, and wherein the adjusting the system clock according to the work mode and the first time, the second time, the third time and the fourth time further comprises:

calculating the time offset $Offset=[V1\times(t2-t1)-V2\times(t4-t3)]/(V1+V2)$, the forward path delay, and the reverse path delay by the first formula, the second formula, a third formula and a fourth formula, according to the first time, the second time, the third time, the fourth time, a forward propagation rate and a reverse propagation rate, wherein the forward propagation rate is determined according to a forward wavelength in the wavelength division multiplexing mode, and the reverse propagation rate is determined according to a reverse wavelength in the wavelength division multiplexing mode;

calculating a delay compensation by a fifth formula according to the forward path delay and the reverse path delay; and adjusting the system clock according to the time offset and the delay compensation;

wherein the third formula is: $Delay1=L/V1$, wherein the fourth formula is: $Delay2=L/V2$, wherein the fifth formula is: $\Delta t=(Delay2-Delay1)/2$, and wherein L represents length of the single-fiber bi-directional line, V1 represents the forward propagation rate, V2 represents the reverse propagation rate, and $\Delta t$ represents the delay compensation.

6. A device for time synchronization, service packets being transmitted between the device and another device via two lines, wherein the device comprises:

a line processing module, configured to:

select a port of a single-fiber bi-directional line of the two lines as a synchronization port of a 1588 clock protocol;

specify a work mode of the synchronization port, wherein each of one or more 1588 clock synchronization packets comprises a synchronization packet and a delay request packet;

exchange the synchronization packet and the delay request packet with the another device through the synchronization port according to the work mode;

acquire a first time and a second time according to a time stamp generated when the synchronization packet is exchanged, wherein the first time is a time of sending the synchronization packet by the master device, and the second time is a time of receiving the synchronization packet by a slave device; and acquire a third time and a fourth time according to a time stamp generated when the delay request packet is exchanged, wherein the third time is a time of sending the delay request packet by the slave device, and the fourth time is a time of receiving the delay request packet by the master device;

a clock recovery module, configured to restore a system clock according to the 1588 clock synchronization packets; and a clock adjustment module, configured to adjust the system clock according to the work mode and the first time, the second time, the third time and the fourth time;

wherein the clock adjustment module is configured to calculate a time offset $Offset=[(t2-t1)-(t4-t3)]/2$ by a first formula and a second formula, according to the first time, the second time, the third time, and the fourth time, and adjust the system clock according to the time offset;

wherein the first formula is: $t2-t1=Delay+Offset$, wherein the fourth formula is: $t4-t3=Delay2-Offset$, and wherein t1 represents the first time, t2 represents the second time, t3 represents the third time, t4 represents the fourth time, Delay represents path delay, and Offset represents the time offset.

7. The device according to claim 6, wherein the work mode is a time division multiplexing mode, and the line processing module is configured to:

receive, through the synchronization port, the synchronization packet sent by the another device in a first time slice;

send, through the synchronization port, the delay request packet to the another device in a second time slice; and receive, through the synchronization port, a delay response packet returned by the another device in a third time slice.

8. The device according to claim 7, wherein the clock adjustment module is configured to:

calculate the time offset as Offset=[(t2−t1)−(t4−t3)]/2 by the first formula and the second formula, according to the first time, the second time, the third time, and the fourth time; and adjust the system clock according to the time offset.

9. The device according to claim 6, wherein the work mode is a wavelength division multiplexing mode, and the line processing module is configured to:

receive, through the synchronization port, the synchronization packet that is with a wavelength of a forward wavelength and is sent by the another device;

send, through the synchronization port, the delay request packet with a wavelength of a reverse wavelength to the another device; and receive, through the synchronization port, a delay response packet that is with a wavelength of the forward wavelength and is returned by the another device.

10. The device according to claim 9, wherein path delay in the first formula is a forward path delay Delay1=t2−t1−Offset, and path delay in the second formula is a reverse path delay Delay2=t4−t3+Offset; and wherein the line processing module is further configured to:

calculate the time offset Offset=[V1×(t2−t1)−V2×(t4−t3)]/(V1+V2), the forward path delay, and the reverse path delay by the first formula, the second formula, a third formula, and a fourth formula, according to the first time, the second time, the third time, the fourth time, a forward propagation rate and a reverse propagation rate, wherein the forward propagation rate is determined according to a forward wavelength in the wavelength division multiplexing mode, the reverse propagation rate is determined according to a reverse wavelength in the wavelength division multiplexing mode;

calculate a delay compensation by a fifth formula, according to the forward path delay and the reverse path delay; and adjust the system clock according to the time offset and the delay compensation;

wherein the third formula is: Delay1=L/V1, wherein the fourth formula is: Delay2=L/V2, wherein the fifth formula is: Δt=(Delay2−Delay1)/2; and wherein L represents length of the single-fiber bi-directional line, V1 represents the forward propagation rate, V2 represents the reverse propagation rate, and Δt represents the delay compensation.

* * * * *

UNITED STATES PATENT AND TRADEMARK OFFICE
CERTIFICATE OF CORRECTION

PATENT NO. : 8,817,823 B2  
APPLICATION NO. : 13/735858  
DATED : August 26, 2014  
INVENTOR(S) : Shen et al.

Page 1 of 1

It is certified that error appears in the above-identified patent and that said Letters Patent is hereby corrected as shown below:

On Title Page, Applicant, "Guangdong (CN)" should read -- Shenzhen (CN) --.

In the Claims

Column 9, line 56, "mater" should read -- master --.

Signed and Sealed this  
Sixth Day of January, 2015

Michelle K. Lee  
*Deputy Director of the United States Patent and Trademark Office*